Oct. 15, 1946.    J. E. JOHNSON    2,409,209
REMOVABLE BASKET NUT
Filed July 25, 1944    2 Sheets-Sheet 1
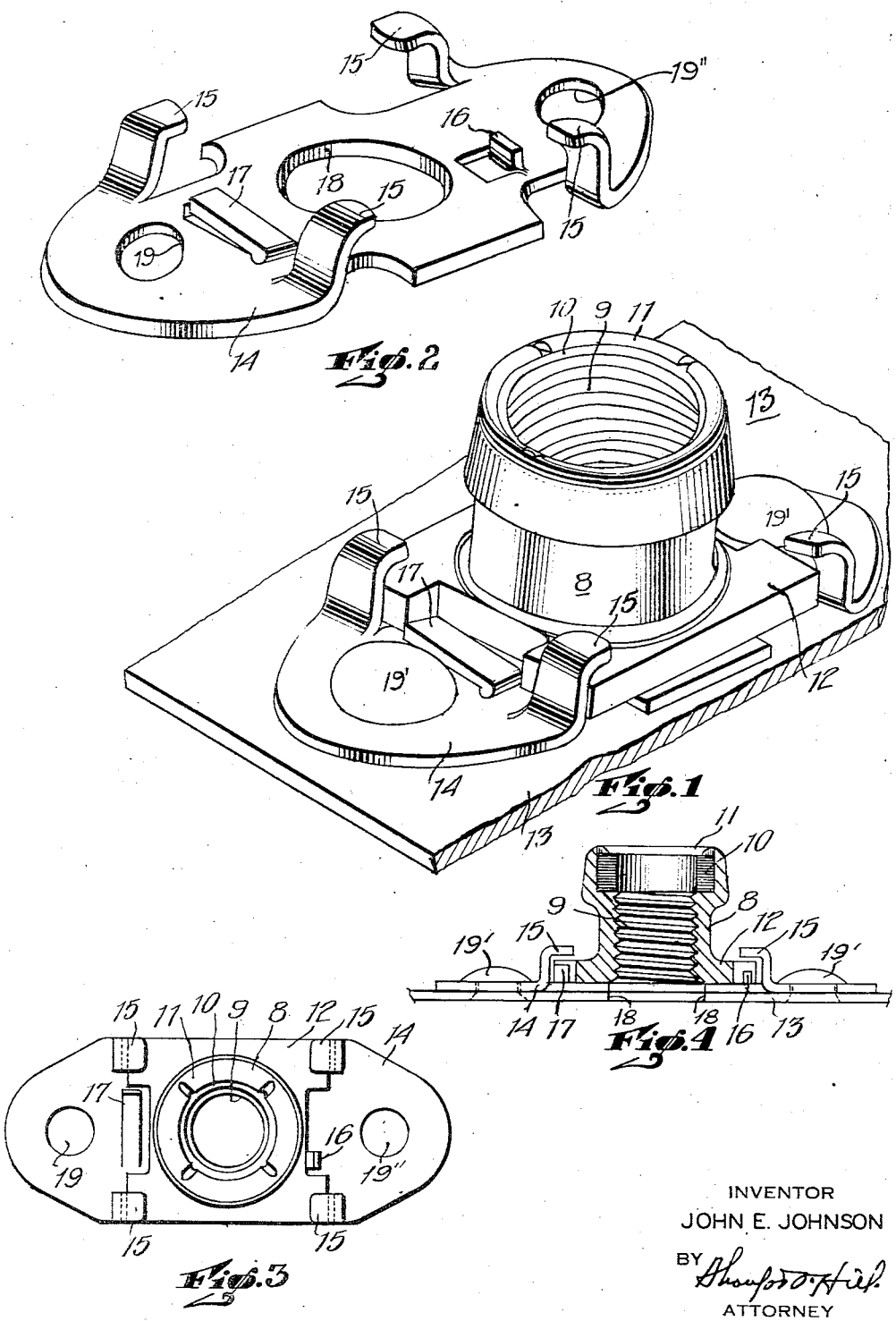
INVENTOR
JOHN E. JOHNSON
BY
ATTORNEY Oct. 15, 1946.　　　　J. E. JOHNSON　　　　2,409,209
REMOVABLE BASKET NUT
Filed July 25, 1944　　　2 Sheets-Sheet 2
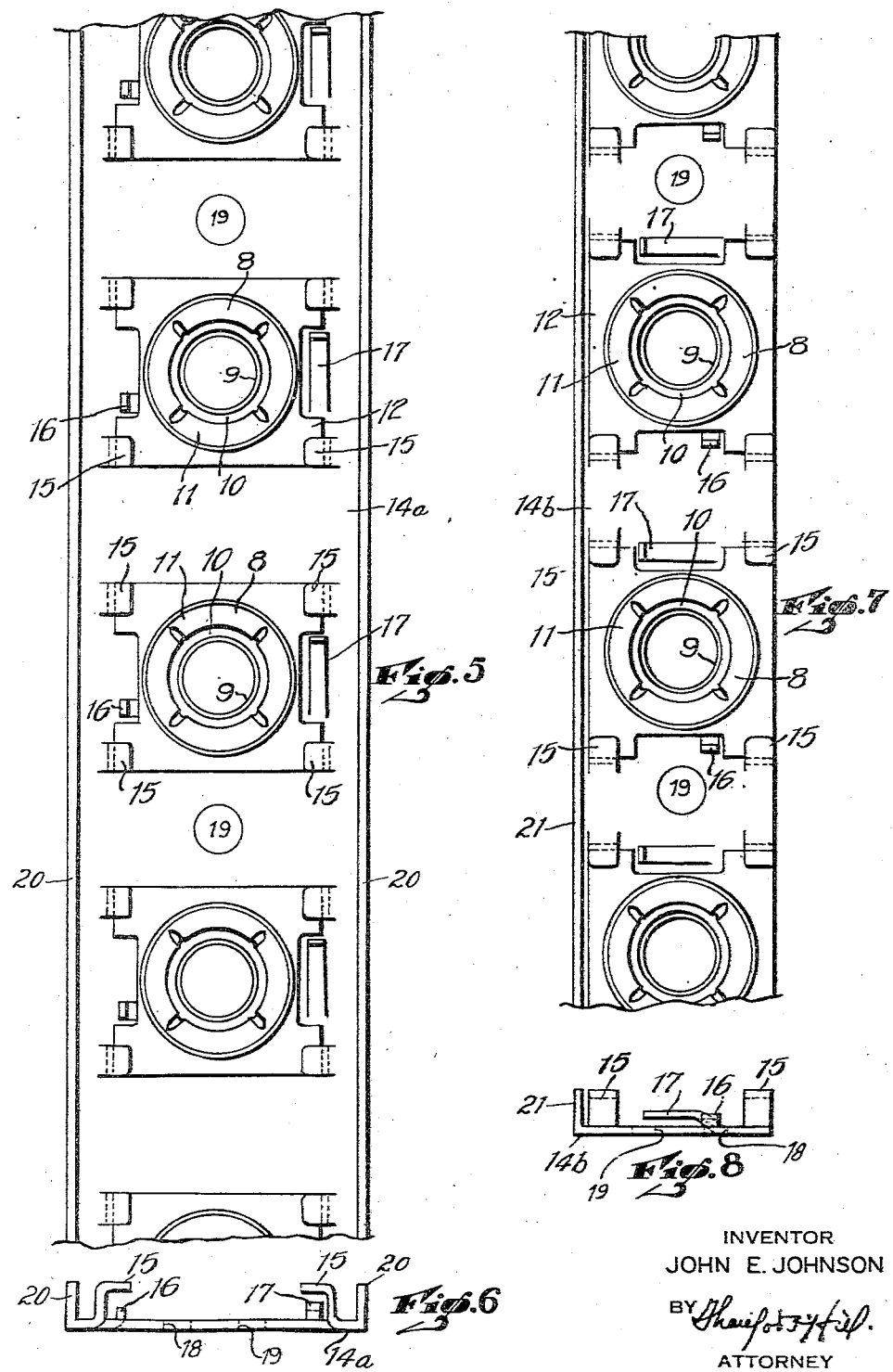
INVENTOR
JOHN E. JOHNSON
ATTORNEY Patented Oct. 15, 1946

2,409,209

UNITED STATES PATENT OFFICE 2,409,209

REMOVABLE BASKET NUT

John E. Johnson, Morristown, N. J., assignor to Elastic Stop Nut Corporation of America, Union, N. J., a corporation of New Jersey Application July 25, 1944, Serial No. 546,446

5 Claims. (Cl. 85—32)

This invention relates to improvements in fastening devices, and more particularly to a fastening device for joining two or more plates or the like together, such as by nut and bolt, or screw. More particularly, the invention relates to a fastening device which may be removably attached to a support or carrier in predetermined position, either singly or in multiple, in such manner that threaded portions of the device may be removed and replaced when desired.

In attaching two or more plates or parts together, in structures such as airplanes or the like, it is often necessary to place one element of a fastening device in a "blind," inaccessible or concealed position. In such instances, it has been customary to utilize nuts which are attached singly or in multiple to one of the plates, the screw or bolt being inserted through a suitable hole from the side opposite that on which the nut is attached. Until the second plate is placed against the first, the nut is accessible, so that a worn or defective nut can be replaced when the two or more plates are partially or entirely detached. However, when a single nut, or a structure embodying a plurality of nuts, is permanently attached to one of the parts, as by rivets or the like, it is necessary to remove the rivets and then re-rivet the new nut or structure, when replacing worn or defective nuts.

Some of the objects of this invention are to provide a fastening device which may be relatively and permanently secured to a plate or the like, but a portion of which comprises a fastening or threaded element such as a nut, which may be removed and replaced at will; a fastening device wherein turning or radial movement of the nut or fastening element is prevented; a device in which a limited lateral movement of the nut is permitted to compensate for differences in alignment of the nut and the hole or holes through which the screw or bolt extends; a device which comprises a threaded element and a basket or support therefor in which the threaded element may readily be disassembled from the support; a device which includes a single threaded element or a plurality of threaded elements which may be transported without difficulty; a device which may be assembled and disassembled at will; a device in which both the threaded element and the basket or support may be manufactured with ease; a device in which a nut may readily be detached from its support; but in which the nut, when in use, will be held securely to the support despite vibration, jarring, and the like; a device in which a plurality of thread carrying elements are attached to a single support, which support may be secured by rivets or the like to one of the parts to be joined together; a device wherein the threaded element or nut may be placed in or removed from the support without the use of special tools, whereby the device may be installed by relatively unskilled labor; and a support which may, with equal ease, be attached to a plate either with or without the nut or thread carrying element attached thereto.

Other objects and novel features of this invention will become apparent from the following description and accompanying drawings, in which:

Fig. 1 is a perspective view of an installed fastening device embodying this invention;

Fig. 2 is a perspective view of a basket for the nut included in the showing in Fig. 1.

Fig. 3 is a plan view, looking downwardly, on the device shown in Fig. 1;

Fig. 4 is a side view partly in longitudinal section, showing the device in Fig. 1;

Fig. 5 is a plan view, looking downwardly on a carrier or support provided with a plurality of nuts or threaded fastening elements;

Fig. 6 is an end view of the support or carrier shown in Fig. 5;

Fig. 7 is a plan view, looking downwardly on a modified arrangement of the showing in Fig. 5 and Fig. 8 is an end view of the support or carrier shown in Fig. 7.

Reference character 8 indicates a fastening device which may be in the form of a nut threaded at 9, and provided with stop means such as the recessed ring 10, clinched and held by the annular turned-in portion 11. 12 indicates a laterally extending base or flange portion of the nut which may be secured upon the strip 13, preferably of metal.

Between the strip 13 and the nut-base 12 is provided the intervening basket portion 14, also preferably of metal and having engaging upwardly and inwardly extending lugs 15 for said base as shown in Fig. 1, also an upwardly extending projection or lug 16 for engaging said base, and a resiliently depressable projection 17 substantially opposite said lug 16, all for preventing substantial movement of said nut laterally, longitudinally, or upwardly of said strip 13, but permitting said nut to slide over said spring-like member 17 when the latter is depressed in the plane of said basket 14. The projections 16 and 17 enter suitable notches formed in the flange portion 12 of the nut.

A round hole 18 may also be provided through the basket 14 and carrier 13 for passage of the bolt into the nut 8, and likewise spaced holes 19 and 19" through strip 13 and basket 14 respectively may be provided for rivets 19', or the lugs 15 and 16 and the resilient projection 17 may be formed directly from the strip 13 instead of upon basket 14, if desired. In fact, various modifications may be made in the construction and arrangement of parts without departing from the spirit of the invention as claimed.

In Figs. 5 and 6 the basket is in the form of a channel member 14a formed with a plurality of spaced sets of lugs 15 and 16 and resilient projections 17, each set removably retaining a nut 8. The channel may be provided with flanges 20 on each side and the lugs and projections are so arranged that the nuts are inserted and removed by movement lengthwise of the channel.

The embodiment shown in Figs. 7 and 8 is similar to that just described, except that the lugs and projections are so positioned with respect to the channel 14b that the nuts 8 are inserted and removed by movement crosswise of the channel. In order to permit such movement, the channel has but a single flange 21.

In either of these last two embodiments, the channels may be secured to a sheet, corresponding to sheet 13 of Figs. 2 and 4, by rivets or the like passing through apertures 19.

I claim:

1. In a fastening device, a nut basket and a nut removably secured thereto, said nut including a threaded portion and a flange portion extending laterally therefrom, said nut basket having a base portion, a plurality of bent-over lugs extending upwardly from said base portion and overlying said flange portion to restrain lateral movement in two opposite directions and rotary and axial movement of the nut, and a plurality of projections extending upwardly from said base portion and engaging edges of said flange portion for restraining movement of the nut in two opposite lateral directions at right angles to the first mentioned directions, at least one of said projections being resiliently displaceable to permit insertion and removal of said nut into and from said basket.

2. In a fastening device, a nut basket and a nut removably secured thereto, said nut including a threaded portion and a flange portion extending laterally therefrom, said nut basket having a base portion, a plurality of spaced confronting lugs for permitting said flange portion to be inserted in one lateral direction so that the lugs overlie the flange to restrain the nut against rotation and axial displacement, and means including a resilient tongue struck up from the base portion and engaging the flange to releasably restrain movement of the nut relative to the basket in the lateral direction opposite to that in which it was inserted.

3. In a fastening device, a nut basket and a nut removably secured thereto, said nut including a threaded portion and a flange portion extending laterally therefrom, said nut basket having a base portion, two spaced pairs of bent-over lugs struck up from said base portion, the lugs of each pair being spaced from each other in confronting relationship for permitting said flange portion to be inserted in one lateral direction so that the lugs overlie the flange to restrain the nut against rotation and axial displacement, and means including a resilient tongue struck up from the base portion between lugs of different pairs and engaging the flange to releasably restrain movement of the nut relative to the basket in the lateral direction opposite to that in which it was inserted.

4. In a fastening device, a nut basket and a nut secured thereto, said nut including a threaded portion and a flange portion extending laterally therefrom, opposite edges of said flange portion being formed with notches, said nut basket having a base portion, a plurality of bent-over lugs extending upwardly from said base portion and overlying said flange portion to restrain lateral movement in two opposite directions and rotary and axial movement of said nut, and means projecting upwardly from said base portion between said lugs and extending into said notches for restraining movement of the nut in two opposite lateral directions at right angles to the first mentioned directions.

5. In a fastening device, a nut basket and a nut removably secured thereto, said nut including a threaded portion and a flange portion extending laterally therefrom, opposite edges of said flange portion being formed with notches, said nut basket having a base portion, a plurality of bent-over lugs extending upwardly from said base portion and overlying said flange portion to restrain lateral movement in two opposite directions and rotary and axial movement of said nut, and projections extending upwardly from said base portion between said lugs and extending into notches for restraining movement of the nut in two opposite lateral directions at right angles to the first mentioned directions, at least one of said projections being resiliently displaceable out of the notch to permit insertion and removal of said nut into and from said basket.

JOHN E. JOHNSON.